3 Sheets--Sheet 1.

O. W. ALLISON.
Paper-Bag Machines.

No. 155,483.  Patented Sept. 29, 1874.

Witnesses: J. J. Bonner, Chas. B. Wheeler

O. W. Allison, Inventor
by Jay Hyatt, Atty.

THE GRAPHIC CO. PHOTO-LITH. 39 & 41 PARK PLACE, N.Y.

O. W. ALLISON.
Paper-Bag Machines.

No. 155,483. Patented Sept. 29, 1874.

Witnesses
O. W. Allison, Inventor
by Jay Hyatt, Atty.

3 Sheets--Sheet 3.

O. W. ALLISON.
Paper-Bag Machines.

No. 155,483. Patented Sept. 29, 1874.

Witnesses

O. W. Allison, Inventor
by Jay Hyatt
Atty.

UNITED STATES PATENT OFFICE.

OSCAR W. ALLISON, OF BUFFALO, NEW YORK.

IMPROVEMENT IN PAPER-BAG MACHINES.

Specification forming part of Letters Patent No. 155,483, dated September 29, 1874; application filed March 26, 1874.

*To all whom it may concern:*

Be it known that I, OSCAR W. ALLISON, of the city of Buffalo, in the county of Erie and State of New York, have invented certain Improvements in Machines for Making Paper Bags, of which the following is a specification:

My invention relates to that class of machines which are used in the manufacture of flat-bottom or grocery paper bags.

Figure 1:
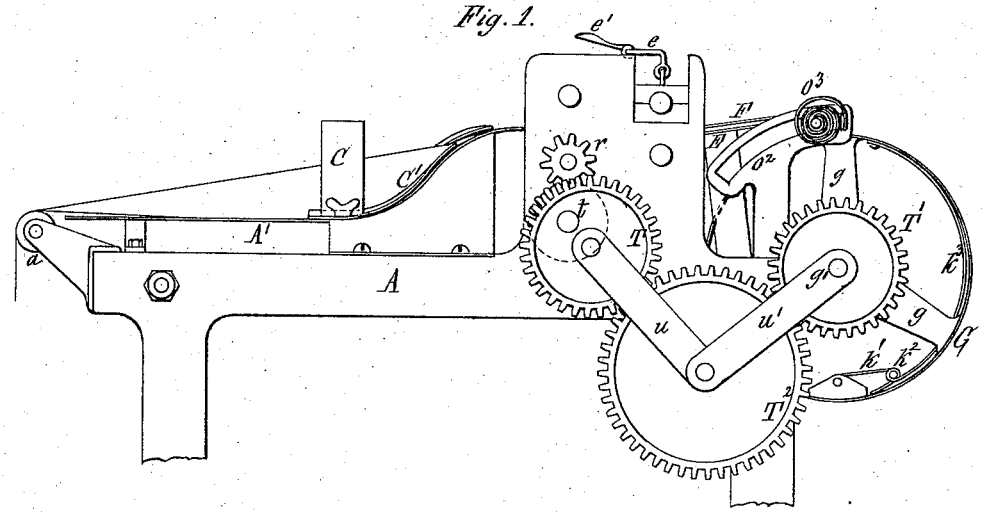
Figure 2:
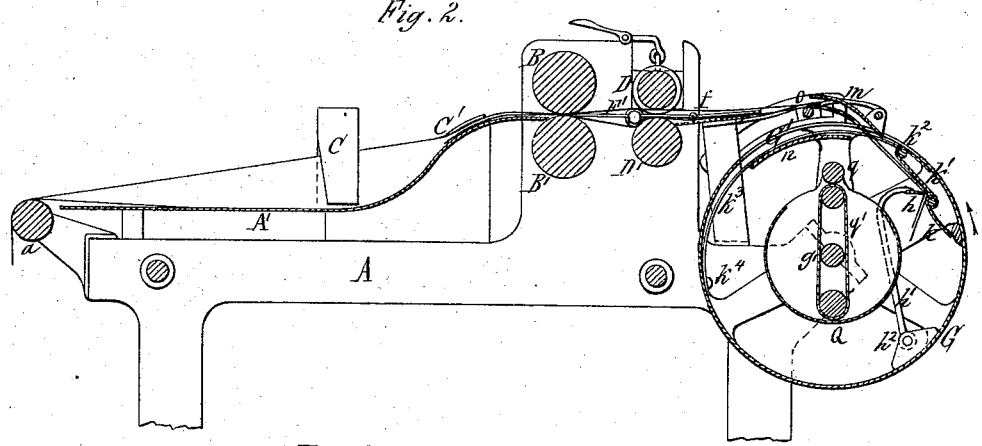
Figures 3, 9:
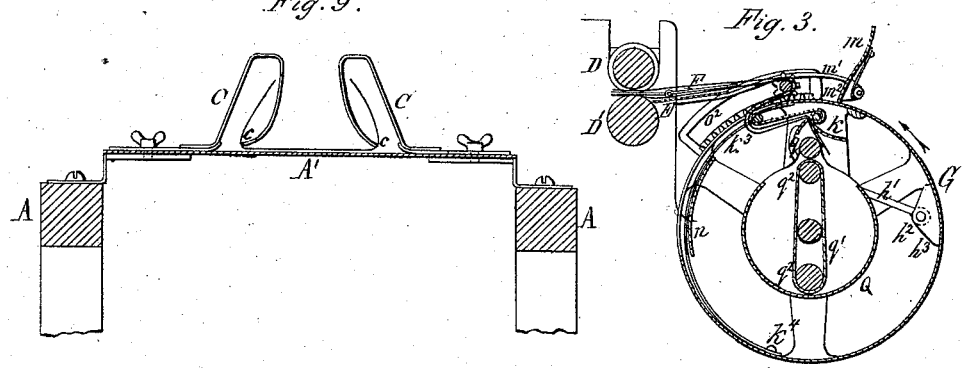
Figure 4:
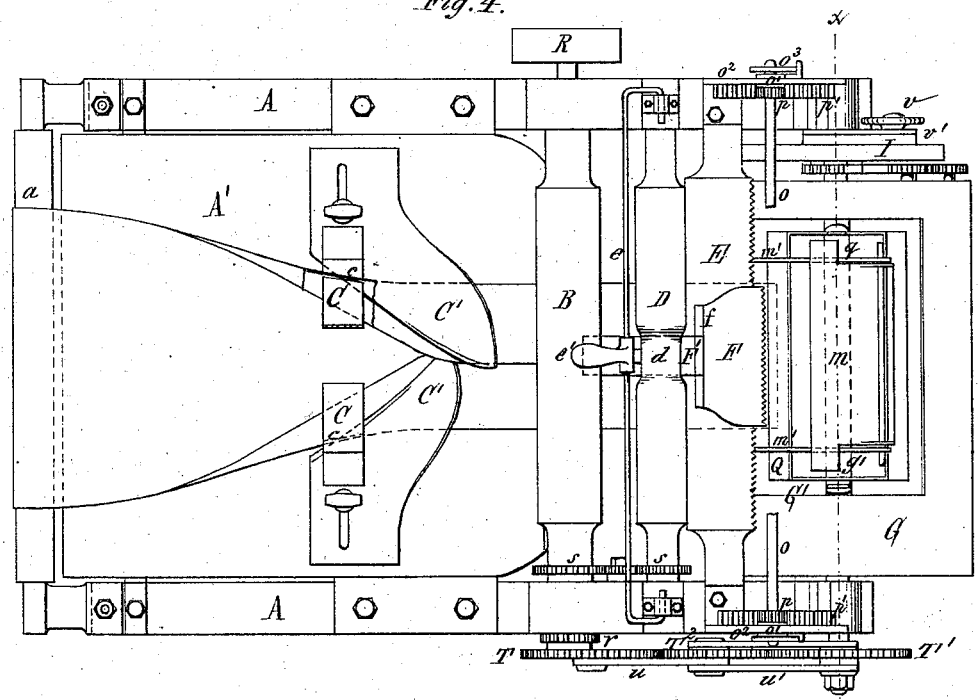
Figure 5:
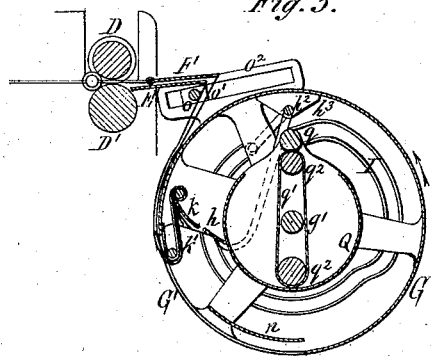
Figure 6:
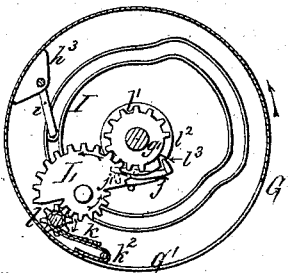
Figure 7:
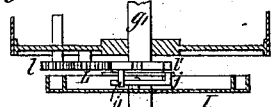
Figures 8, 17:
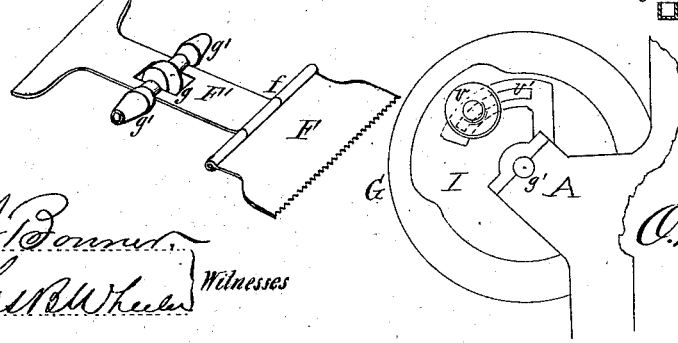
Figure 10:
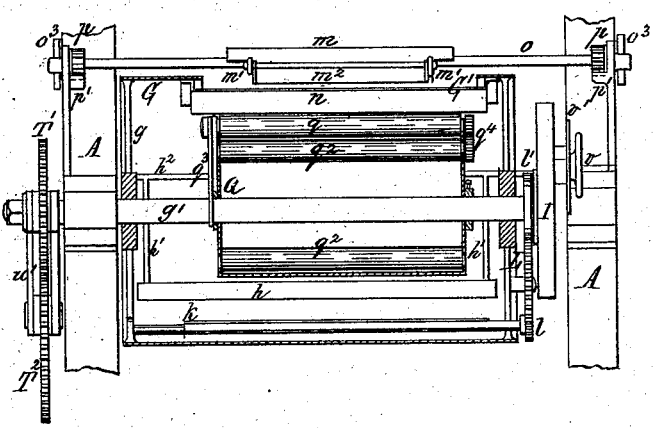
Figure 11:
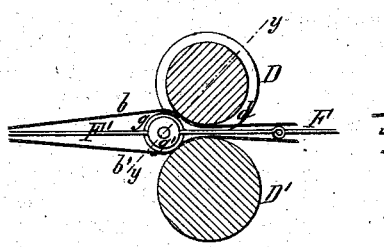
Figure 13:
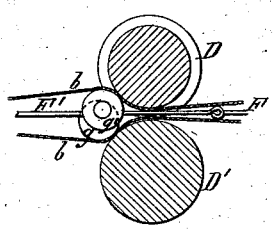
Figure 14:
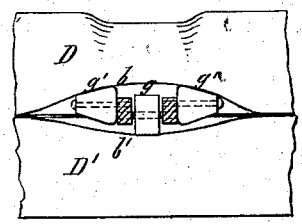
Figure 12:
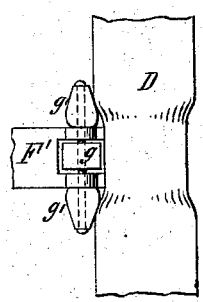
Figure 16:
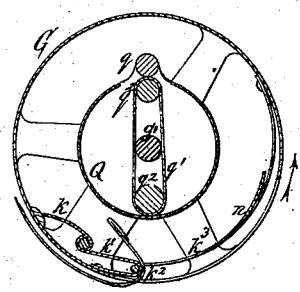
Figure 15:
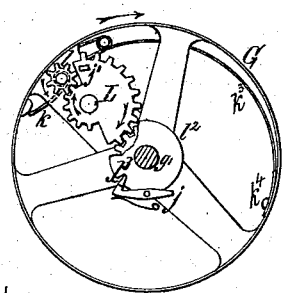

In the accompanying drawings, consisting of three sheets, Figure 1 is a side elevation of my improved machine; Fig. 2, a longitudinal vertical section thereof. Fig. 3 is a central sectional view of the hollow drum and connecting parts, showing the manner in which paste is applied to the bottom fold. Fig. 4 is a top-plan view of the machine. Fig. 5 is a central cross-section of the hollow drum, in the position in which the bag is severed from the paper tube. Fig. 6 is an inner view of the mechanism by which the bottom-folding bar is operated. Fig. 7 is a sectional bottom-plan view thereof. Fig. 8 is a perspective view of the detached knife. Fig. 9 is a cross-section through the bed-plate of the machine, showing the creasing-fingers. Fig. 10 is a vertical section through the hollow drum in line $x\,x$, Fig. 4. Fig. 11 is a detached sectional view, on an enlarged scale, of the device by which the detached knife is held in place. Fig. 12 is a plan view thereof at right angles to the line $y\,y$, Fig. 11. Fig. 13 is a detached sectional view, showing a slightly-modified arrangement of the mechanism holding the knife. Fig. 14 is an elevation of Fig. 13. Fig. 15 is an end view of the drum, showing the mechanism by which the bottom-folding bar is operated. Fig. 16 is a cross-section of the drum, showing the position in which the completed bag is discharged therefrom.

Like letters designate like parts in each of the figures.

A A represent the two side frames of the machine, and A' the bed-plate supported between the same. $a$ is the horizontal guide-roller, arranged at the rear end of the bed-plate, and in line therewith, so as to guide the web of paper from the roll to the bed-plate. B B' represent two feed-rollers, arranged at the opposite end of the bed-plate A'. The rear portion of the bed-plate is made horizontal, while its portion adjacent to the feed-rollers is made curved or inclined upwardly to a point midway between said feed-rollers. The vertical distance from the point of contact of said feed-rollers to the horizontal portion of the bed-plate exceeds slightly one-half of the width of the largest bag which the machine is designed to produce. C C represent two creasing-fingers arranged opposite each other at the lower end of the rising portion of the bed-plate, so as to reach over the upturned portions of the paper web and descend on the inner side thereof, where they terminate near the bed-plate, as shown at $c$ $c$, Figs. 4 and 9, against the ends of which the side creases or folds of the paper tube are formed. C' C' represent two folding fingers or plates arranged in front of the fingers C C, on the inclined or curved portion of the bed-plate, for the purpose of folding down the upturned portion of the paper, the end of one finger, which forms the overlapping edge of the paper, projecting slightly beyond and in front of the other one, as shown in Fig. 4.

The fingers C C are preferably secured with their bases to the fingers C' C', and the latter made adjustable on the bed-plate, so that each pair of folding-fingers on one side of the paper web can be adjusted simultaneously toward and from the center line of the machine to adapt them to form paper tubes of different widths. D D' represent two rollers arranged at a short distance horizontally from the feed-rollers B B', for the purpose of holding the upper detached knife F. One of the rollers D D' (preferably the upper roller, D) is provided at the middle with an annular groove or reduced portion, $d$. E is the lower toothed knife, arranged in front of the rollers D D', and secured with its ends to the side frames A. The upper knife F is hinged at $f$ to a bar, F', arranged between the rollers D D' in the recess $d$, and extending rearward to the rollers B B'. The bar F' is provided with a central roller, $g$, and two conical side rollers, $g'$ $g'$, for the purpose of preventing said bar and the knife F attached thereto from following the movement of the paper tube, and for retaining the said knife in its central position. The knife F and bar F' are arranged within the paper tube, so as to be inclosed thereby.

The central roller $g$ is so arranged as to rest against the lower portion $b'$ of the paper tube, and presses the latter against the lower roller $D'$, while it clears the upper roller $D$ and the upper portion $b$ of the paper tube, and the end rollers $g'$ rest only against the upper portion $b$ of the paper tube and against the curved sides of the recess $d$ of the upper roller $D$, and clears the lower portion of the paper tube. By this arrangement the rollers $g$ and $g'$ are enabled to turn freely in opposite directions, corresponding with the movement of the respective portions of the paper tube against which they bear. The outer rollers $g'$ retain by their conical shape the knife F in its proper central position. As represented in Figs. 11 and 12, the three rollers are arranged in the same axial line, the central roller $g$ being made of larger diameter than the side rollers $g'$, and the reduced portion $d$ sufficiently small to prevent the large central roller from coming in contact with the same. In Figs. 13 and 14 the three rollers $g$ $g'$ are represented as of the same size, the axis of the outer rollers $g'$ being raised above that of the inner roller $g$, whereby the inner and outer rollers are enabled to run in contact with their respective portion of the paper tube without touching the other portion thereof. The speed of the front rollers $D$ $D'$ being slightly greater than that of the feed-rollers $B$ $B'$, there is a certain tension produced in the portion of the paper tube between said two pairs of rollers, which is exerted upon the rollers $g$ $g'$. As the latter are arranged in close proximity to the rollers $D$ $D'$, the angle formed by the upper and lower parts of the paper tube, between the rollers $D$ $D'$ and $g$ $g'$, is less acute than that formed by the two parts of the tube between the rollers $g$ $g'$ and $B$ $B'$, which causes, in connection with the pressure of the paper upon the rollers $g$ $g'$, a tendency of the latter and the knife-bar $F'$ to move backwardly. Such a movement is, however, prevented by the rear end of the bar $F'$ resting against the feed-rollers $B$ $B'$, as shown in Fig. 2. The end of the bar is preferably enlarged laterally in order to increase the bearing-surface thereof, as represented in Fig. 8. The upper roller, $D$, is held in contact with the lower one, $D'$, by its own gravity, and provided with a suitable elevating device for inserting and removing the knife F into the paper tube. The elevating device, as shown in the drawings, consists of a transverse rod, $e$, connecting with the bearings of the roller $D$, and provided with an arm or handle, $e$, by which the rod is turned and the roller raised. The lower knife, E, may be made of the same length as the feed-rollers, while the detached knife F must correspond in length with the inner width of the bag to be formed. G represents the hollow drum, provided with a longitudinal opening, $G'$, through which the paper tube is fed into the same. It is arranged with its upper portion in front of and slightly below the knives, and revolves in an opposite direction to the feed-motion of the paper tube, as indicated by arrows. The drum G is secured by arms $g$ to a shaft, $g'$, turning in suitable bearings of the side frames A. $h$ represents the bottom tucking or clamping bar or blade, arranged lengthwise in the drum G, and secured near each end of the drum to the free ends of two arms, $h^1$, mounted on a shaft, $h^2$, which turns in bearings $h^3$, secured to the inner surface of the drums. The shaft $h^2$ is provided with a short arm, $i$, carrying a roller, which runs in a cam, I, secured to one of the side frames A, whereby the clamping-bar $h$ is opened and closed. $k$ represents the bottom-folding bar, pivoted in the ends of the drum, and arranged with reference to the clamping-bar $h$ so that the latter will close against the bar $k$ near its fulcrum, Fig. 2. The bar $k$ is provided with a band or apron, $k^1$, running from its fulcrum over a rod, $k^2$, arranged near the opening $G'$ of the drum, and thence back a short distance to the inner surface of the drum, where it is secured. The bar $k^2$ is attached to the free ends of two curved spring-arms, $k^3$, secured to the inner side of the drum at $k^4$, and holding, by their tension, the folding-bar $k$ in an open position. $l$ is a pinion, secured to the end of the pivot or shaft of the bar $k$, and L a double-gear segment, composed of two half gear-wheels, and pivoted in one of the arms of the drum G. The segment L is interposed between the pinion $l$ and a gear-wheel, $l^1$, mounted loosely on the shaft $g'$ of the drum G. The radius of that portion of the segment L which engages with the pinion $l$ is about half as large as that of the portion engaging with the wheel $l^1$. The wheel $l^1$ is provided with a flange, $l^2$, having a notch, $l^3$, in which engages a spring-pawl, $j$, pivoted to the inner side of the cam I, so as to retain the wheel $l^1$ stationary, while the pinion $l$ and segment L revolve with the drum around the same. The pinion $l$ is thereby revolved, and the folding-bar $k^1$ closed until the segment L has nearly completed half of a revolution, when the spring-pawl $j$ is withdrawn from the notch $l^3$ by a nose or projection, $j'$, of the segment L striking upon the tail end of said pawl. The wheel $l^1$ is in this manner released, when the bar $k$ is opened by the reaction of the spring-arms $k^3$, and the gear-wheels $l$ $l^1$ L returned to their former position. $m$ is a curved guide-plate, arranged between the knives and the drum G, so as to insure the entrance of the paper tube into the latter. It is provided with a tail portion, $m^2$, projecting slightly into the opening $G'$ of the drum G, and pivoted to two rods, $m^1$, projecting from under the lower knife.

When the end of the paper tube is about to be fed into the drum, the guide-plate $m$ is in the position shown in Fig. 2, with its main portion forming a guide from the knives to the opening $G'$ of the drum, and its tail portion projecting slightly into the latter. As the drum revolves, the rear edge of the opening G' strikes the portion $m^2$ of the guide $m$, swinging the latter upwardly on its pivots, as shown in Fig. 3, the portion $m^2$ resting on the solid part of the drum during the revolution thereof until the opening G' again coincides with the portion $m^2$ of the guide $m$, when the latter is swung downwardly on its pivots, and returned to its former position by a suitable spring.

$n$ is a shield, arranged and secured within the drum G, so as to partially obstruct the opening G', and prevent the paper tube from coming in contact with the paste-roller. $o$ is a tension bar or rod, arranged under the knives F E, and between the latter and the drum G. It is held in bearings $o^1$, sliding in curved or straight slotted guides $o^2$, arranged at each end of the drum and attached to the frames A. The bar $o$ is retained in position away from the knives by suitable springs $o^3$, of such tension that they will yield to the pressure of the paper tube on the bar $o$ as it passes over the latter. In order to retain the bar $o$ parallel with the knives in all positions, small pinions $p$ are mounted on the rod near the guides $o^2$, and the latter are provided with parallel gear-racks $p'$, in which said pinions engage, Figs. 3 and 10. Q represents the paste-drum, arranged concentrically within the drum G, and mounted loosely on the shaft $g'$ thereof. The portion opposite its open side is weighted, to maintain the latter in the highest position while the drum G revolves. The drum Q is retained against longitudinal movement on the shaft $g'$ by adjustable collars secured thereto, or any other suitable means. $q$ is the paste-roller, arranged above the opening of the paste-drum; and $q^1$, an endless apron, passing over two rollers, $q^2$, so as to elevate the paste from the lower portion of the drum Q to the paste-roller. The latter is revolved by an endless belt, $q^3$, Fig. 10, connecting it with the shaft $g'$, and is geared in a suitable manner, as shown at $q^4$, with the upper roller $q^2$, so as to operate the apron $q^1$. The driving-pulley R is secured to the shaft of the lower feed-roller B', which shaft is provided at the opposite end with a gear-wheel, $r$, meshing with a wheel on a counter-shaft, $t$, on which is mounted eccentrically a gear-wheel, T. The latter is connected with a gear-wheel, $T^1$, on the shaft $g'$ of the drum G by an intermediate gear-wheel, $T^2$, supported by two connecting-links, $u$ $w'$, hung on the shafts $t$ and $g'$, respectively.

By this means a motion of varying speed is transmitted to the drum G.

The rollers D D' are driven from the rollers B B' by gear-wheels $s$, in an ordinary manner.

The operation is as follows: The web of paper is fed from the roller $a$ onto the bed-plate A' and paste applied to one edge thereof for forming the side seam in any common and well-known manner. The side creases are formed by the inner edges of the fingers C C, and the upturned edges of the paper web turned down by the fingers C' C', whereby the paper tube is formed. When the end of the paper tube is passed between the feed-rollers B B' the upper knife F is placed within the paper tube with the rollers $g$ $g'$ in rear of the roller D', the upper roller D being raised for this purpose. The knife F being in this manner inclosed by the paper tube, the roller D is lowered in contact with the latter, whereby the knife is securely held in place. Power being applied to the driving-pulley R, the paper tube is fed forward toward the drum G, which latter rotates in a direction opposite to the motion of the paper tube. The latter is directed by the guide $m$ under the band $k^1$ and bar $k$. When a length of paper tube sufficient to form the bottom fold has passed the fulcrum of the bar $k$ the clamping-bar $h$ is closed against the latter by the above-described cam-motion, and the paper tube tucked and clamped between the pivot of the bar $k$ and the apron $k^1$, as clearly shown in Fig. 2. The end of the paper tube is now carried around with the drum and the projecting bottom fold passed over the paste-roller $q$, as clearly shown in Fig. 3, by which the paste is applied to the inner surface thereof. The guide $m$ is now swung out of the way, as above described, so as to permit the paper tube to bend upward over the bar $o$ during this reversal of its movement, the hinging of the knife F to the bar F' enabling the former to adapt itself to this position of the paper tube, as shown. The closing of the folding-bar $k$ begins after the bar $h$ has clamped the end of the paper tube, the bar $h$ releasing the same when the drum has completed about one-quarter of a revolution, and after the folding-bar $k$ is sufficiently closed to firmly hold the end of the paper tube without the aid of the bar $h$. As the drum revolves the slack of the paper tube is taken up and the latter drawn over the bar $o$, thereby preventing the wrinkling of the tube, the said bar receding under the knives as the drum revolves. The bar $o$ having receded to the position shown in Fig. 5, the speed of the drum G is now increased over the feed-motion of the paper by the gear mechanism above described to such a degree as to produce a tension in the paper tube sufficient to separate the paper by the teeth of the knives penetrating the same.

I have found by experiment that at the point the paper is drawn against the edges of the knives a circumferential velocity of the drum G seven times greater than the feed-motion of the paper tube will operate to properly sever the paper. The drum may be made to revolve at a greater velocity, while a less velocity of movement may perhaps be sufficient, which will depend in a measure upon the condition of the edges of the knives and the quality of the paper.

During the operation of severing the bag the folding-bar $k$ is tightly closed and the bottom of the bag completed. The bar is then opened by the pawl $j$ releasing the wheel $l^1$, and the completed bag discharged from the drum through the opening G' by the reaction of the spring-arms $k^3$, as shown in Fig. 16. The motion of the drum is slowest while the end of the paper tube is being clamped and passing over the paste-roller, while it is fastest when the paper tube is being cut. The cam I is made adjustable within certain limits by means of a set-screw, $v$, passing through a slotted segment, $v'$, or equivalent means, so that the point at which the bottom-folding bar $h$ clamps and releases the paper tube can be regulated thereby, and the length of the bottom fold is determined.

The movements of the parts of my machine are so regulated that the drum G will make one revolution during the time the paper tube is fed forward the length of the blank required. The cam I is so adjusted as to cause the bar $h$ to clamp the end of the paper tube when such a length of the blank has been fed beyond the knives as will form the complete blank, with the additional length of tube fed past the knives during the movement of the drum from the clamping-point to the point at which the entire slack of the paper tube is taken up by the accelerated motion of the drum and the bag severed from the tube.

What I claim as my invention is—

1. The combination, with the curved or inclined bed A', of the correspondingly-formed folding-fingers C' and hook-shaped creasing-fingers C, secured together and adjusted simultaneously, substantially as hereinbefore set forth.

2. The combination, with the rollers B B' and D D', the latter moving slightly faster than the former, of the knife-bar F', provided with rollers $g$ $g'$, and retained between the rollers B B' and D D', substantially as hereinbefore set forth.

3. The combination, with the bar F', provided with retaining-rollers, of the knife F, hinged to said bar to enable the knife to adapt itself to the varying positions of the paper tube, substantially as hereinbefore set forth.

4. The combination of the knife-bar F', rollers $g$ $g'$ $g'$, and the rollers D D', the roller D being provided with a recess, $d$, the whole constructed and operating substantially as hereinbefore set forth.

5. The combination, with the revolving drum G, of the clamping-bar $h$, band $k^1$, and bottom-folding bar $k$, substantially as and for the purpose hereinbefore set forth.

6. The combination, with the revolving drum G and the clamping-bar $h$, of the arms $h^1$, shaft $h^2$, roller-arm $i$, and cam I, substantially as and for the purpose hereinbefore set forth.

7. The combination, with the revolving drum G and pivoted folding-bar $k$, of the gear-wheels $l$ $l^1$, with notched flange-wheel $l^2$, double-gear segment L, and spring-pawl $j$, substantially as and for the purpose hereinbefore set forth.

8. The combination, with the wheel $l^1$, having notched flange $l^2$, and spring-pawl $j$, of the segment L, provided with releasing-pin $j'$, substantially as and for the purpose hereinbefore set forth.

9. The combination, with the revolving drum G, of the pivoted folding-bar $k$, band $k^1$, rod $k^2$, and spring-arms $k^3$, substantially as and for the purpose hereinbefore set forth.

10. The combination, with the revolving drum G, provided with the opening G', of the pivoted self-acting plate $m$, for guiding the end of the paper tube to the folding-bar, substantially as hereinbefore set forth.

11. The combination, with the revolving drum G, of the inner stationary paste-receptacle Q, as hereinbefore set forth.

12. The combination, with the revolving drum G and paste-receptacle Q, of the paste-roller $q$ and bottom-clamping mechanism, substantially as hereinbefore set forth.

13. The combination, with the revolving drum G, having an opening, G', of the inner shield $n$, to prevent the paper tube from coming in contact with the paste-roller, substantially as hereinbefore set forth.

14. The combination, with the knives E F, of the revolving drum G, having a feed-opening, G', and a bottom clamping and folding mechanism, and revolving with varying speed in an opposite direction to the motion of the paper tube, so that the paper bag is separated from the tube by tearing it off on the toothed edges of the knives, substantially as hereinbefore set forth.

15. The combination, with the knives and revolving drum G, of the spring tension-rod $o$, to prevent wrinkling of the paper tube, substantially as hereinbefore set forth.

16. The combination, with the spring tension-rod $o$, of the slotted guides $o^1$, pinions $p$, and gear-racks $p'$, substantially as and for the purpose hereinbefore set forth.

17. The combination, with the revolving drum G, opening G', and bottom-clamping mechanism, composed of the tucking-blade $h$, arms $h^1$, shaft $h^2$, and arm $i$, with its roller, of the adjustable cam I, whereby the clamping mechanism is operated, substantially as hereinbefore set forth.

OSCAR W. ALLISON.

Witnesses:
J. J. BONNER,
CHAS. B. WHEELER.